Nov. 14, 1950 I. L. CAPPS ET AL 2,530,284

RECORDING STYLUS

Filed Nov. 25, 1947 4 Sheets-Sheet 1

INVENTORS
*Isabel L. Capps*
*Emory G. Cook*
BY *Joseph V. Meigs*
ATTORNEY

Nov. 14, 1950 I. L. CAPPS ET AL 2,530,284
RECORDING STYLUS
Filed Nov. 25, 1947 4 Sheets-Sheet 2

INVENTORS
Isabel L. Capps
Emory G. Cook
BY Joseph V. Meigs
ATTORNEY

RECORDING STYLUS

Filed Nov. 25, 1947 4 Sheets-Sheet 3

INVENTORS
Isabel L. Capps
BY Emory G. Cook
Joseph V. Meigs
ATTORNEY

Nov. 14, 1950 I. L. CAPPS ET AL 2,530,284

RECORDING STYLUS

Filed Nov. 25, 1947 4 Sheets-Sheet 4

INVENTORS
Isabel L. Capps
BY Emory G. Cook
Joseph V. Meigs
ATTORNEY

Patented Nov. 14, 1950 2,530,284

UNITED STATES PATENT OFFICE 2,530,284

RECORDING STYLUS

Isabel L. Capps, Westbury, and Emory G. Cook, Floral Park, N. Y., assignors to Frank L. Capps & Co. Inc., New York, N. Y., a corporation of New York Application November 25, 1947, Serial No. 788,012

2 Claims. (Cl. 274—38)

This invention relates to the art of recording sound and is directed in particular to a sound recording stylus.

Capps U. S. Patent 2,187,512, January 16, 1940, describes a stylus which can be used to engrave sound modulated grooves in a record made of suitable plastic or waxy materials, the grooves extending transversely in relation to the surface of the sound record. The stylus of the said Capps patent (commonly made from sapphire) is described in said patent as having an elongated flat cutting face terminating in a lower V-shaped portion. The lower portions of the sapphire stylus are ground away on each side to form two flat clearance faces which intersect each other to form an edge which may be designated the "back" edge and extends upwardly from the apex of the V, the angle subtended between said back edge and the plane of the front cutting face being less than 90° e. g. about 45°. The cutting face terminates in a cutting edge and in said Capps patent there is provided a single burnishing facet adjacent said cutting edge. The surface of said burnishing facet intersects the cutting face to form said cutting edge. The lower portion of the stylus is preferably rounded and is referred to as the "radius."

The general purpose of the said burnishing facets is to produce a smooth modulated groove as free as possible from the distortions which produce undesired sound effects or noise. While the stylus of the Capps patent succeeds in accomplishing that purpose to a considerable extent as evidenced by the commercial success thereof, there are certain difficulties and limitations associated with the use of that stylus. For example, under conditions of heavy modulation the stylus is carried on an excursion which forms a slope of 30 degrees or more to the axis of an unmodulated groove. The single burnishing facet of the Capps patent stylus is usually polished at an angle of 25 degrees to the side wall of an unmodulated groove or 115 degrees from the cutting face of the stylus. While it is possible to increase or decrease this angle, the 25 degree angle has been found optimum for best results for the following reasons:

As the stylus is carried on excursions of varying slopes from the axis of an unmodulated groove, the angular relationship between the burnishing facets and the side walls will vary according to that slope. For example, where the slope is 20 degrees and the facets 25 degrees as described, one facet will now form a 5 degree angle to the adjacent groove wall, while the other forms a 45 degree angle with its adjacent groove wall. Under these conditions both groove walls are being effectively polished. However, when the slope of the groove reaches 25 degrees, one burnishing facet has the same angle as the slope of the groove and will therefore not bring burnishing action to bear upon that groove wall, while the other burnishing facet forms an angle of 50 degrees with its adjacent groove wall.

Likewise when a slope of 30 degrees exceeds the angle of one burnishing facet so that the stylus presents a sharp point to its adjacent side wall, the other burnishing facet has formed an angle of 55 degrees with its adjacent side wall. Under the latter two conditions not only is one groove wall not being effectively burnished, but the other groove wall is being burnished by a facet which forms with the adjacent groove wall such a large angle as to approach a cutting face tending to tear rather than burnish. It is true that the angle of the burnishing facet could be increased to 35 degrees in relationship to the walls of an unmodulated groove so that in a groove whose slope is 30 degrees adequate burnishing effect would take place on the groove wall where the angle between burnishing facet and wall would be five degrees. But the other groove wall will be torn due to the fact that the angular relationship between burnishing facet and that groove wall has become 65 degrees. In accordance with the present invention continuous burnishing action is ensured despite groove slope by creating two or more burnishing facets adjacent to each other any one of which will become effective in proper angular relationship to the adjacent groove wall depending upon the extent of groove slope. The lateral motion of a cutting stylus encounters considerable resistance by the plastic thereby placing a limitation on frequency response. There is a certain amount of return flow of the edges of the groove after having been cut by the stylus so that the groove does not hold its shape exactly. Such return flow or restoration causes non-linear or amplitude distortion upon subsequent play-back. Moreover with the stylus of said patent, in order to get the best burnishing effect, it is necessary for each of said burnishing facets to have such width dimension e. g. 5.0 to 7.5 ten thousandths inches, that a limitation may be placed upon the maximum frequencies (and a corresponding limitation on minimum wave lengths as measured along the groove) which can be recorded. The reason for that effect is that, as modulation takes place, the angle between the single burnishing facet of the Capps patent and the wall of the groove changes, said angle decreasing on one side of the groove and increasing on the other side. Unless the said single facet has sufficient width, the volume of plastic displace on one side will not be sufficient to provide an adequate burnishing effect and when said single burnishing facet does have sufficient width, the disadvantages herein stated accrue. According to the present invention, which provides multiple facets laterally of the cutting edge, the above mentioned disadvantages as to frequency response and distortion are overcome to a large extent since each of said multiple facets may have a width of one ten thousandth of an inch (0.0001 inch) making the aggregate width of the group of multiple facets considerably smaller than the width of the above mentioned single facet.

The objects and advantages of the present invention include the following:

1. To produce a stylus which will engrave a burnished groove free from unburnished areas even under conditions of heavy modulation causing high lateral groove velocities.

2. To produce a stylus so constructed and designed that in its lateral motion it will encounter a minimum of resistance by the material in which the sound groove is engraved whereby an improved frequency response is attained.

3. To produce a stylus which will engrave a sound groove in which there is a minimum of "restoration" or return flow of the edges of the groove and therefore a minimum of non-linear or amplitude distortion upon subsequent playing back.

4. To produce a stylus which records higher frequencies.

5. To produce a stylus which cuts a modulated groove having an increased accuracy of play back by means of a standard reproducing stylus, even where the modulation is heavy i. e. during high lateral velocity passages.

In accordance with the present invention, a sound recording stylus is provided which comprises an elongated body having a front surface or cutting face and rearwardly extending clearance surfaces. The cutting face terminates in a sharp cutting edge which has a groove-forming configuration e. g. a V-shape or U-shape. Adjacent said cutting edge there is a group of multiple burnishing facets. The existence of said group of multiple burnishing facets adjacent said cutting edge ensures, as above stated, that the surface of at least one member of said group will always have a true burnishing relation to the adjacent wall of the groove even under conditions of heavy modulation.

In accordance with one specific form of the present invention a sound recording stylus is provided which, like the stylus of Capps U. S. Patent 2,187,512, has a front cutting surface bounded by a cutting edge having a V-shaped configuration, the apex of said V preferably being round and forming a radius portion as in said Capps patent, the stylus also having two rearwardly extending plane clearance surfaces. However, unlike the stylus of said Capps patent the present invention provides a group of narrow elongated surfaces constituting multiple burnishing facets adjacent said cutting edge. One of said multiple burnishing facets constitutes a leading burnishing facet, is adjacent to the cutting face and lies in a plane which intersects the plane of the cutting face to form the cutting edge. Each member of said group of multiple burnishing facets except the leading facet, may be termed a trailing burnishing facet. If said group of multiple burnishing facets consists of two members the trailing burnishing facet of said group will be adjacent to a clearance surface and will also be adjacent to the leading burnishing facet and will lie in a plane which intersects the plane of the leading burnishing facet at an obtuse angle. The line of said intersection is roughly parallel to the cutting edge. Should said group of burnishing facets contain more than two members, one of those members will always be a leading burnishing facet and will be located adjacent to the cutting face and one of the other and trailing members of the group will be adjacent to a clearance surface. The angular relationships of the surfaces of the leading and trailing facets to each other and to the surface of the cutting face may be varied considerably the purpose being however always to have at least one member of each group which will exercise a burnishing action on the material of the groove wall even under conditions of heavy modulation. Illustrative examples of the angular relationships mentioned may be recited for the case where the group of multiple burnishing facets consists of two members. In such case the surface of the leading burnishing facet may intersect the surface of the cutting face to form supplementary angles, one acute and the other obtuse, the acute angle varying for example from 30 to 60 degrees, the said acute angle being subtended between said leading burnishing facet and an extension of the cutting face. The second or trailing facet is adjacent the leading facet and the surface of said trailing facet intersects the surface of the leading facet (forming an obtuse angle therewith) and if extended would intersect an extension of the cutting face to form supplementary angles therewith, one obtuse and the other acute. Said acute angle may vary from 90 to 45 degrees.

While the purely physical changes above mentioned may appear to be small, the functions flowing from those seemingly small physical changes are of substantial importance and will be hereinafter fully explained.

The principles of the invention will be defined in the claims and illustrated by the following detailed description taken in conjunction with the drawings.

Figure 1:
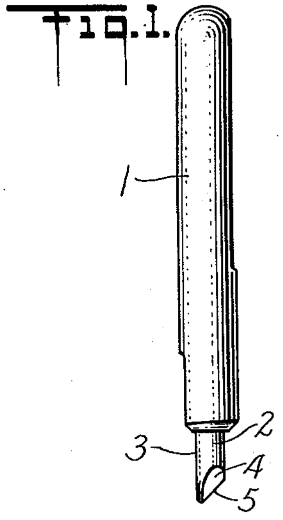
Fig. 1 is a general elevational view showing a cutting stylus of the present invention mounted in a shank or holder.
Figure 2:
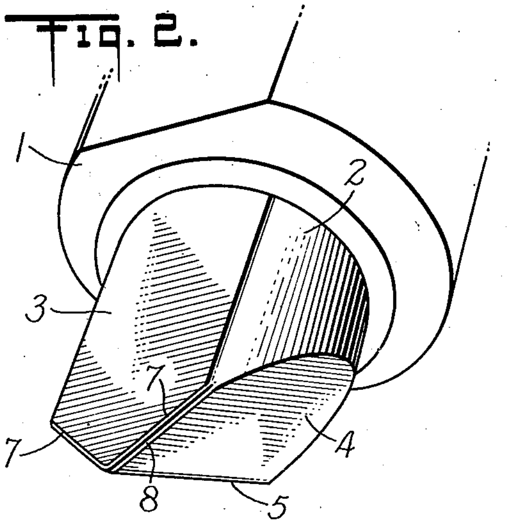
Fig. 2 is an enlarged view of the lower part of Fig. 1.
Figure 3:
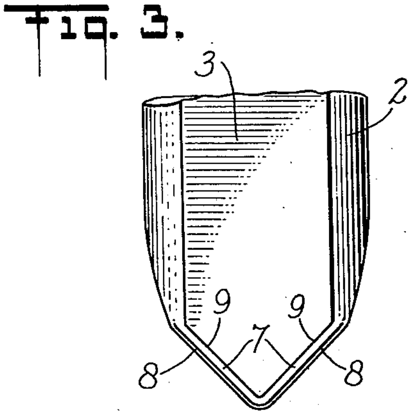
Fig. 3 is an enlarged fragmentary elevational view of a cutting stylus of the present invention looking directly at the cutting face.
Figure 4:
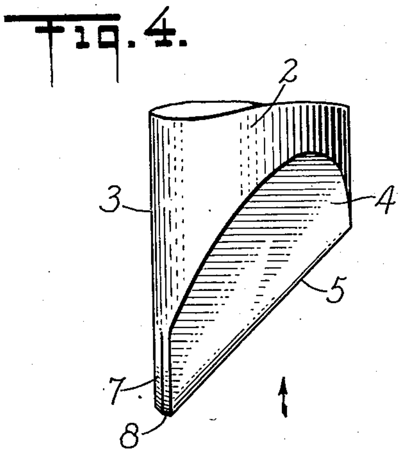
Fig. 4 is a side view of the stylus shown in Fig. 3.
Figure 6:
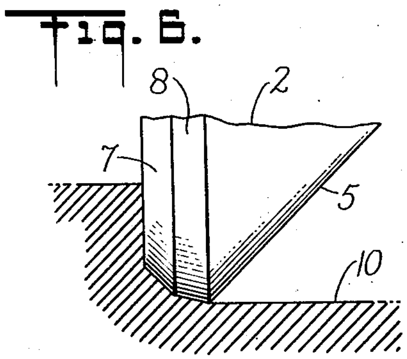
Fig. 6 is a greatly enlarged side view of the functional tip portion of a recording stylus of the present invention.
Figure 5:
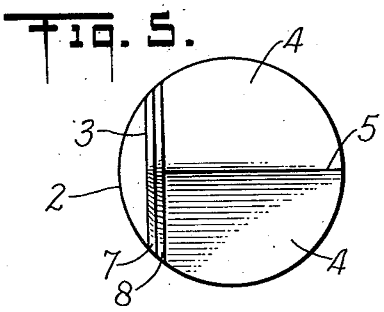
Fig. 5 is a bottom view looking in the direction of the arrow shown on Fig. 4.
Figure 7:
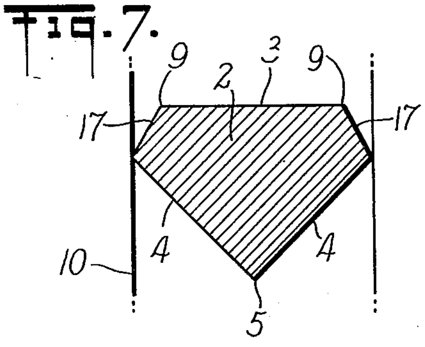

Fig. 7 is a diagrammatic transverse sectional view of the stylus of Capps U. S. Patent 2,187,512 above mentioned as shown in an unmodulated groove and having a single burnishing facet adjacent the cutting edge.

Figure 8:
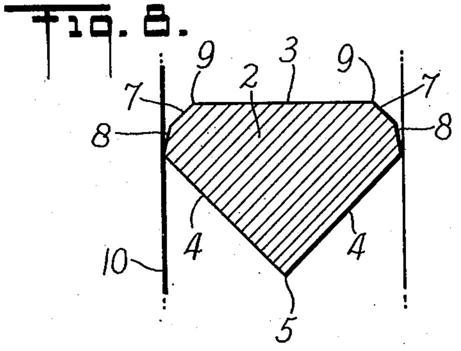

Fig. 8 is a transverse sectional view of the stylus of the present invention as shown in an unmodulated groove and having double burnishing facets adjacent the cutting edge.

Figure 9:
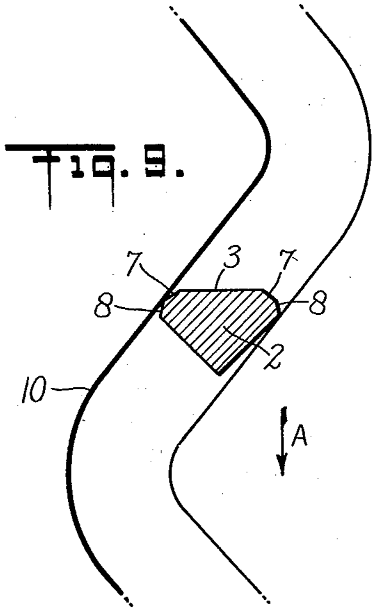

Fig. 9 is an enlarged fragmentary view of a modulated groove showing the stylus of the present invention operating therein.

Figure 10:
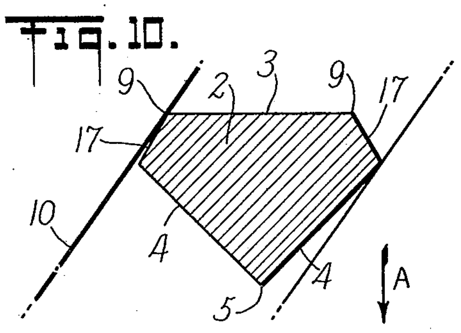

Fig. 10 is an enlarged fragmentary view illustrating a stylus of Capps U. S. Patent 2,187,512 operating in a modulated groove.

Figure 11:
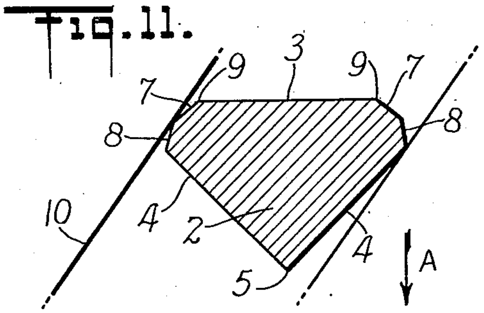

Fig. 11 is an enlarged fragmentary view showing the stylus of the present invention operating in a similarly modulated groove.

Figure 12:
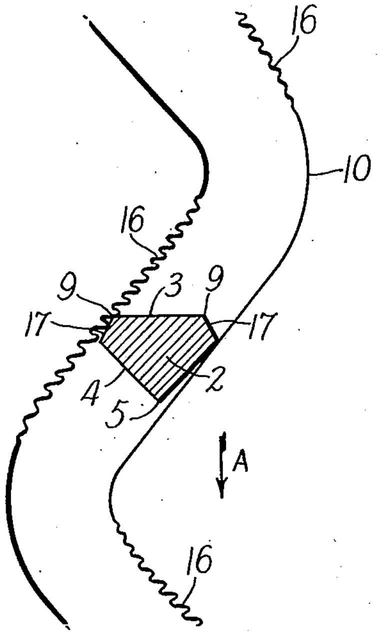

Fig. 12 is an enlarged magnified view of a heavily modulated groove showing the stylus of Capps U. S. Patent 2,187,512 operating therein and shows certain unburnished noise producing areas.

Figure 13:
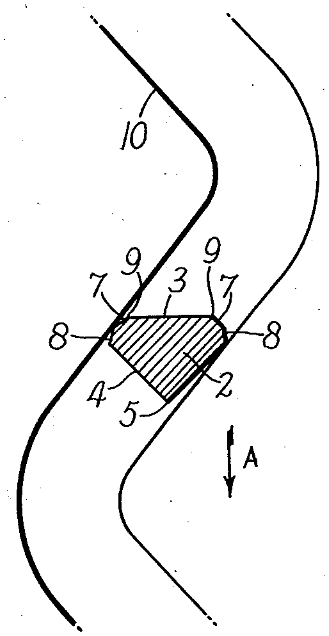

Fig. 13 is a similarly enlarged magnified view of a similarly heavily modulated groove showing the stylus of the present invention operating therein and producing a smooth burnished groove free from said noise producing areas.

Figure 14:
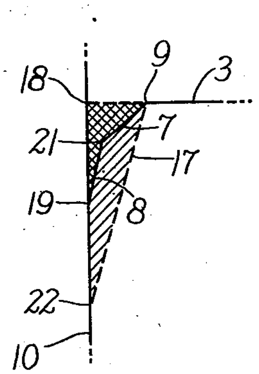

Fig. 14 is an enlarged diagrammatic view showing the comparatively large width of the single burnishing facet of Capps U. S. Patent 2,187,512 in contrast with the small aggregate widths of double burnishing facets of the present invention.

Figure 15:
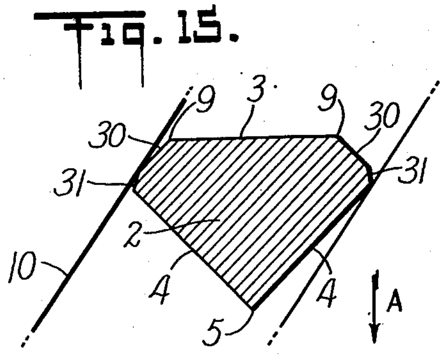

Fig. 15 is an enlarged fragmentary view showing that modification of the present invention wherein the width of one of the burnishing facets is greater than the other.

Figure 16:
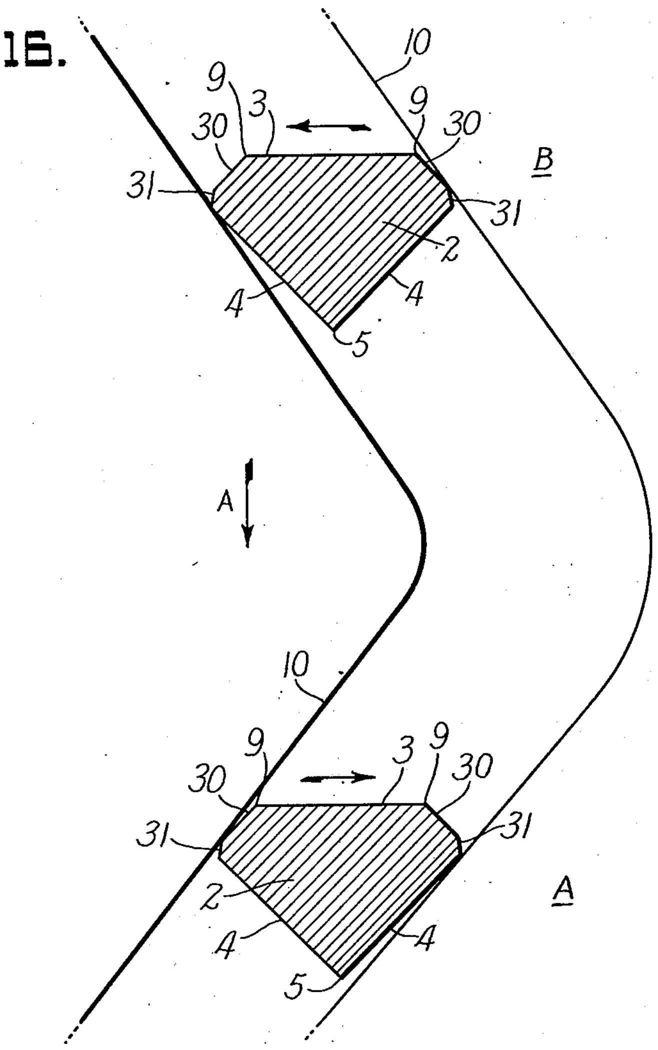

Fig. 16 shows a transverse sectional view of the stylus of Fig. 15 operating in a highly modulated groove of which an enlarged fragmentary view is shown.

Figure 17:
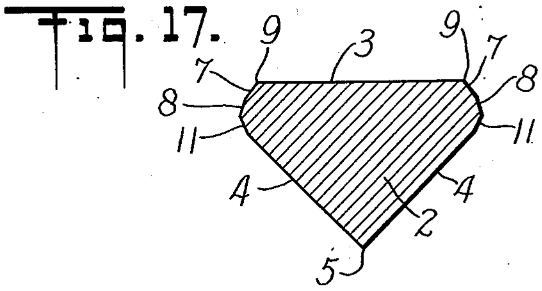

Fig. 17 shows a stylus of the present invention having more than two burnishing facets adjacent the cutting edge.

In Figs. 9, 10, 11, 12, 13, 15 and 16 the arrow A indicates the movement of the record relative to the stylus.

The cutting stylus which may originally be in the form of an elongated cylinder of sapphire is ground to provide the flat cutting face 3 and is then mounted in a holder or shank 1. The sapphire is then further ground to provide the clearance facets 4 which intersect to form the back edge 5. The junction of the clearance facets 4 with the cutting face 3 produces at that point in the grinding operation or process a sharp edge having a V-shape which is ground away in the development of the burnishing facets.

In the stylus of the Capps U. S. Patent 2,187,512 (note Fig. 7) a single burnishing facet 17 is provided adjacent the cutting edge. In accordance with the present invention two or more burnishing facets are provided adjacent said cutting edge. Figs. 1 to 6, 8, 9 and 11 and 13 to 16 show a pair of burnishing facets 7, 8 provided adjacent the cutting edge whereas Fig. 17 shows a group of three burnishing facets 7, 8, 11 provided adjacent the cutting edge.

Referring to Fig. 8 for example, that figure shows two burnishing facets 7 and 8. The former may be designated as the leading burnishing facet and the latter as the trailing burnishing facet. The leading burnishing facet 7, as shown in the drawing, is adjacent the cutting face 3 and intersects the cutting face 3 to form supplementary angles one of which is acute and may vary from about 30 to about 60 degrees. The second burnishing facet is adjacent the first or leading burnishing facet and that second burnishing facet 8 intersects the first burnishing facet 7 and forms an obtuse angle therewith and the surfaces of the second burnishing facet 8 and of the cutting face 3, if extended would form supplementary angles one of which is acute and may vary from about 90 to about 45 degrees.

Figs. 9, 10, 11, 12 and 13 illustrate some of the advantages which flow by the provision of more than one burnishing facet adjacent the cutting edge, those figures illustrating the operation of the stylus of the present invention operating in heavily modulated grooves and contrasting the results obtained thereby with those obtained under similar conditions with the stylus of Capps U. S. Patent 2,187,512. Referring to Fig. 10 for example, it will be seen that on the left side of the groove no burnishing effect is obtained and only a cutting effect. This view illustrates the operation of a stylus of the Capps patent in a groove of the kind mentioned. In contrast therewith it will be seen that in a similar heavily modulated groove as shown in Fig. 11 there is a good burnishing effect on both sides of the groove, it being seen that on the left side of the groove the leading burnishing facet 7 plays a prominent part in the burnishing effect and that on the right side of the groove a similar prominent role is played by the trailing burnishing facet 8.

The effects of the stylus structures and configurations illustrated by Figs. 10 and 11 respectively particularly when cutting or engraving heavily modulated grooves are further illustrated by a comparison of Figs. 12 and 13. It will be seen that the stylus illustrated in Fig. 10 produces unburnished areas 16 whereas the stylus illustrated in Fig. 11, which is the stylus of the present invention cuts a uniformly smooth groove. It is to be understood that the unburnished areas 16 are the source of unsatisfactory noise modulation over the audio cycle as the play back needle sweeps from side to side.

Referring to Fig. 14 the burnishing facet 17 illustrates the relatively wide burnishing facet which is necessary where only a single burnishing facet is provided adjacent the cutting edge, in order to get the best burnishing effect obtainable by that single burnishing facet and it will be seen that that width is much greater than the sum of the widths of the double burnishing facets 7, 8. From an inspection of this figure it will be clear that when a stylus having the cutting face 3, cutting edge 9 and single burnishing facet 17 is employed a relatively large area and mass of plastic material defined by points 9, 18, 22 is displaced whereas in the use of a stylus of the present invention having cutting face 3, cutting edge 9 and double burnishing facets 7, 8 a relatively small area defined by the points 9, 18, 19, 21 is displaced. Furthermore, when a stylus of the present invention is used to cut a groove much less resistance is encountered and better overall frequency response is obtained in recording. For the same reason, i. e., because less material is displaced in the use of a stylus of the present invention there is less "restoration" or return flow of the edges of the groove and therefore less non-linear or amplitude distortion upon subsequent play back. With the smaller aggregate burnishing areas of the stylus of the present invention, a better burnishing effect is obtained than is secured with a stylus having only a single burnishing facet adjacent the cutting edge so that a better burnishing effect is obtained coupled with less "restoration" or flow back.

Another advantage flowing from the use of the multi-burnishing facets adjacent the cutting edge in accordance with the present invention is the ability of the stylus of that invention to record higher frequencies. For example, it is possible to have the aggregate widths of the double or multi-burnishing facets of the order or magnitude of, or even less than, half of the dimension which would be required to produce adequate burnishing in the Capps or single burnishing facet stylus thus permitting the satisfactory recording of much higher frequencies.

In Fig. 17 there is shown diagrammatically a stylus having three burnishing facets 7, 8, 11 established adjacent the cutting edge 9, indeed more than three burnishing facets may be thus established. Because of the presence of two or more burnishing facets it becomes possible to obtain satisfactory burnishing effects even with modulation of high intensity because due to the geometry provided by such multi-facet configuration, there is always present at least one effective burnishing facet adjacent each side of the groove.

Referring to Figs. 15 and 16 there is there shown a stylus having a pair of burnishing facets adjacent the cutting edge 9, one of said facets 30 being wider than the other 31 and Fig. 16 illustrates the advantages of that structure when operating in a highly modulated groove. When a heavily modulated groove such as is shown in Figs. 15 and 16 is played back with the standard play back stylus a considerable lateral or sidewise force must be exerted by the groove upon the point of the stylus as it passes by (as indicated by the two arrows of Fig. 16). In order to avoid scoring and tearing of the side wall of the groove by the play back stylus during this operation at points A and B of Fig. 16, the sides of the groove respectively (right hand side at B, left hand side at A) which must exert the above force on the play back stylus must be more highly burnished than would be necessary for them to withstand the play back operation at lower modulation levels where smaller angles of excursion in the groove take place.

With the leading burnishing facet 30 greater in width dimension than the second or trailing burnishing facet 31 of Fig. 16, it is evident that the right hand side of the groove at B is being more highly burnished in accordance with the foregoing play back requirement by the wide burnishing facet 30. The left hand side of the groove is being burnished mainly by the narrow facet 31 and therefore receives less burnishing. Conversely, at position A Fig. 16, the left hand side of the groove is being highly burnished by the wide leading facet 30 whereas the right hand side receives a lesser degree of burnishing by the narrow facet 31.

What is claimed is:

1. A sound recording stylus comprising an elongated body provided with a cutting face and rearwardly extending clearance surfaces, the cutting face terminating in a sharp cutting edge having a groove-forming configuration, and a group of burnishing facets adjacent said cutting edge, the leading facet of said group intersecting the cutting face at said cutting edge and another member of said group being adjacent the leading facet and intermediate the leading facet and the clearance surfaces.

2. A sound recording stylus comprising an elongated body provided with a cutting face and rearwardly extending clearance surfaces, the cutting face terminating in a sharp cutting edge having a groove-forming configuration, and a group of burnishing facets adjacent said cutting edge, one member of said group being a leading burnishing facet and intersecting the cutting face and forming with an extension of the cutting face an angle of 30 to 60 degrees and another member of said group being adjacent to said leading facet and constituting a trailing facet, said trailing facet forming an obtuse angle with said leading facet.

ISABEL L. CAPPS.
EMORY G. COOK.

REFERENCES CITED

The following references are of record in the file of this patent:

UNITED STATES PATENTS

| Number | Name | Date |
|---|---|---|
| 1,803,060 | Freitag | Apr. 28, 1931 |
| 2,173,050 | Woolf | Sept. 12, 1939 |
| 2,187,512 | Capps | Jan. 16, 1940 |